US006427457B1

(12) United States Patent
Pfefferle et al.

(10) Patent No.: US 6,427,457 B1
(45) Date of Patent: Aug. 6, 2002

(54) REFRIGERANT RECYCLING SYSTEM WITH AUTOMATIC DETECTION OF OPTIONAL VACUUM PUMP

(75) Inventors: Dean P. Pfefferle, Gilberts; Craig F. Govekar, Gurnee, both of IL (US); Michael B. Meeker, Kenosha, WI (US); Larry G. Moller, Harvard, IL (US)

(73) Assignee: Snap-on Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/833,108

(22) Filed: Apr. 11, 2001

Related U.S. Application Data

(60) Provisional application No. 60/213,491, filed on Jun. 23, 2000.

(51) Int. Cl.⁷ ............................................. F25B 45/00
(52) U.S. Cl. ............................................. 62/149; 62/77
(58) Field of Search ............................. 62/149, 475, 77

(56) References Cited

U.S. PATENT DOCUMENTS

| | | | |
|---|---|---|---|
| 3,760,259 A | 9/1973 | Tharman | |
| 4,628,243 A | 12/1986 | Hodgman et al. | |
| 4,675,769 A | 6/1987 | Marshall et al. | |
| 4,856,288 A * | 8/1989 | Weber | 62/129 |
| 4,909,043 A * | 3/1990 | Masauji et al. | 62/158 |
| 5,164,652 A | 11/1992 | Johnson et al. | |
| 5,249,434 A * | 10/1993 | Abraham | 62/292 |
| 5,293,636 A | 3/1994 | Bunton et al. | |
| 5,304,987 A | 4/1994 | Brunson et al. | |
| 5,377,493 A * | 1/1995 | Friedland | 62/77 |
| 5,521,586 A | 5/1996 | Takeshita | |
| 5,526,217 A | 6/1996 | Gormley et al. | |
| 5,625,237 A | 4/1997 | Saeki et al. | |
| 5,783,926 A | 7/1998 | Moon et al. | |
| 5,786,769 A | 7/1998 | Coteus et al. | |
| 6,138,182 A | 10/2000 | Hennessy et al. | |
| 6,154,004 A | 11/2000 | Higuchi | |
| 6,185,945 B1 * | 2/2001 | Pfefferle et al. | 62/149 |

* cited by examiner

*Primary Examiner*—Denise L. Esquivel
*Assistant Examiner*—Malik N. Drake
(74) *Attorney, Agent, or Firm*—Seyfarth Shaw

(57) ABSTRACT

An automatic refrigerant handling apparatus has a compressor pump for withdrawing a refrigerant from an associated refrigeration system to be serviced, a condenser for liquefying the refrigerant and a storage vessel for storing the recovered refrigerant, the compressor pump also being capable of evacuating the refrigeration system to a first refrigeration system pressure. The apparatus has a connection jack for receiving a connector of an associated optional vacuum pump, the connector including a jumper which interconnects two terminals on the jack when the vacuum pump is connected so that the control circuitry of the apparatus can recognize the presence of the vacuum pump, whereupon the program routine of the control processor utilizes the vacuum pump instead of the compressor pump to draw a vacuum on the associated refrigeration system.

15 Claims, 3 Drawing Sheets

REFRIGERANT RECYCLING SYSTEM WITH AUTOMATIC DETECTION OF OPTIONAL VACUUM PUMP

RELATED APPLICATION

This application claims the benefit of the filing date of U.S. provisional application No. 60/213,491, filed Jun. 23, 2000.

BACKGROUND

This application relates to refrigerant handling systems and, in particular, to systems for automatically recycling refrigerant from the air conditioning systems of automotive vehicles.

Typically, automotive air conditioning service systems are designed to recover refrigerant from the vehicle air conditioning system, remove impurities therefrom and recycle the conditioned refrigerant back to the vehicle after servicing of the air conditioner is complete, so as to minimize venting of refrigerant to atmosphere. Such service systems commonly include a compressor for withdrawing refrigerant in vapor form from the vehicle and compressing it, a condenser for liquefying the compressed vapor, a storage vessel for storing the recovered refrigerant and a vacuum pump for drawing a vacuum on the automotive air-conditioning system prior to recharging recycled refrigerant thereto.

In some prior refrigerant recycling systems there is no vacuum pump. Rather, the compressor is utilized as both a compressor and as a pump for drawing a vacuum on the automotive refrigeration system. This reduces the cost and complexity of the system, but also reduces the performance somewhat, since the compressor pump is not capable of drawing a vacuum to as low a refrigeration system pressure as could be achieved with a separate vacuum pump. While it is possible in such recycling systems to retrofit the system with a vacuum pump in order to improve performance, this is a relatively complicated procedure and would normally require a technician from the manufacturer to perform the installation at substantial cost to the customer.

SUMMARY

This application discloses a refrigerant handling apparatus which avoids the disadvantages of prior apparatuses while affording additional structural and operating advantages.

An important aspect is the provision of an automatic refrigerant handling apparatus which permits simple installation of an optional device by a user without the need for professional technical assistance.

Another aspect is the provision of an apparatus of the type set forth which includes a processor operating under stored program control and which automatically recognizes the presence of the optional device to alter the operation of the apparatus accordingly.

A still further aspect is the provision of an apparatus of the type set forth, wherein the optional device is a vacuum pump.

Yet another aspect is the provision of a method of utilizing the apparatus of the type set forth.

Certain ones of these and other aspects may be attained by providing an automatic refrigerant handling apparatus comprising: a compressor pump having a suction port adapted to be coupled to an associated refrigeration system to be serviced and a discharge port, a condenser coupled to the discharge port, a refrigerant storage vessel coupled to the condenser, control circuitry including a processor operating under control of a stored program and coupled to the compressor pump for controlling operation thereof in accordance with a predetermined procedure for recycling refrigerant from the refrigeration system, and a connection jack connected to the control circuitry and adapted to mateably receive a connector of an associated optional device, the control circuitry including a sensing circuit for detecting connection of the connector to the jack, the stored program including a routine responsive to the sensing circuit for altering the predetermined procedure to utilize the optional device if connection of the connector to the jack is detected.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
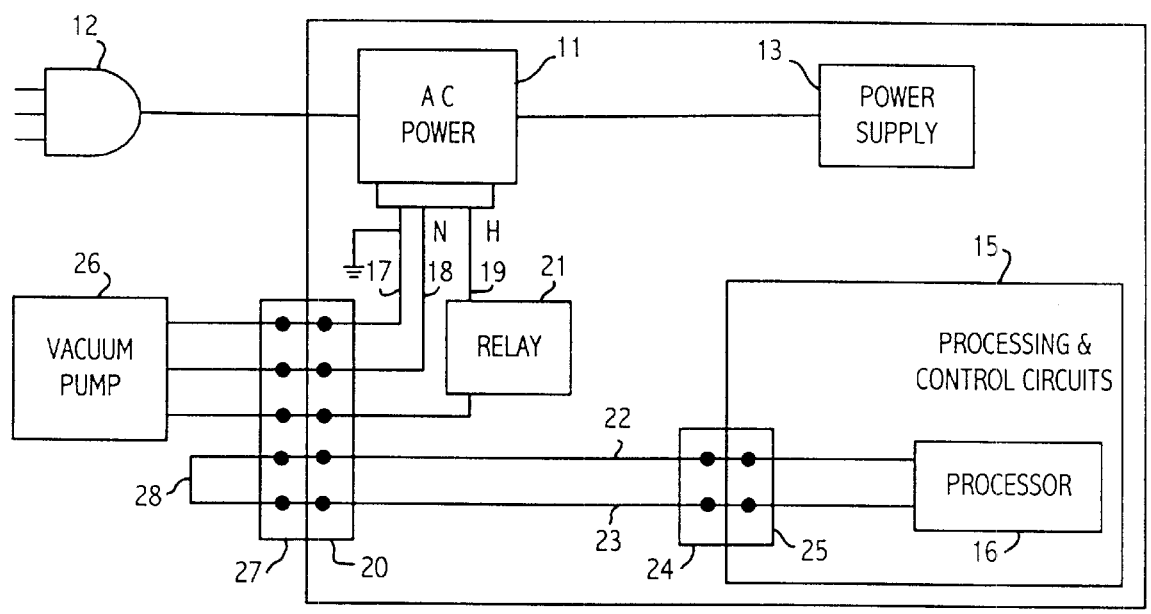
FIG. 1 is a partially functional block and partially schematic diagram of a refrigerant handling apparatus.
Figure 2:
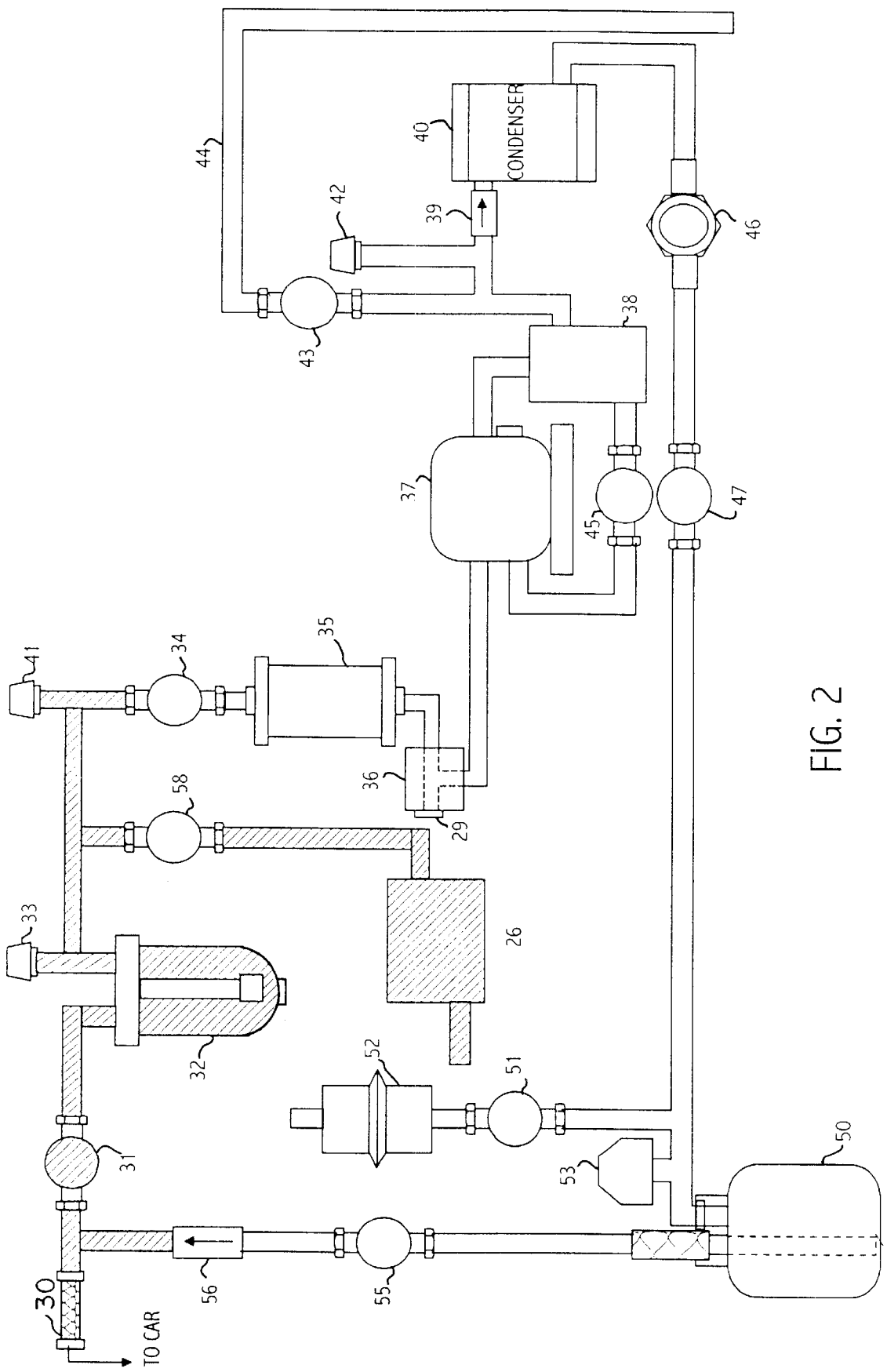
FIG. 2 is a fluidic schematic diagram of the apparatus of FIG. 1.

Referring to FIGS. 1 and 2, there is illustrated a refrigerant recycling system, generally designated by the numeral 10, which is, for the most part, a type commercially available from Snap-on Diagnostics under the designation "KoolKare." Accordingly, only so much of the recycling system 10 as is necessary for an understanding of the present invention is described herein. Referring to FIG. 1, the system 10 includes an AC power circuit 11 provided with a three-prong plug 12 for connection to a standard AC supply. The AC power circuit 11 is connected to a power supply circuit 13, which provides suitable DC voltage to processing and control circuits 15, which include a processor 16 operating under stored program control. The AC power circuit 11 has a ground line 17, a neutral line 18 and a "hot" line 19 in standard fashion, respectively connected to corresponding terminals of a five-terminal connection jack 20, which is mounted at a conveniently accessible location on the system housing. The hot line 19 is connected to the connection jack 20 through a relay 21, operating under control of the processing and control circuits 15. The other two terminals of the connection jack 20 are, respectively, connected to one end of sense lines 22 and 23, the opposite ends of which are respectively connected to terminals of a plug 24 which is mateably engageable with a jack 25 of the processing and control circuits 15, the jack 25 in turn being connected to the processor 16. The sense lines 22 and 23 cooperate with the processor to form a sensing circuit.

The recycling system 10 includes an optional vacuum pump 26 having three power lines connected to corresponding terminals of a connector plug 27 which is adapted to be plugged into the connection jack 20 for electrically connecting the vacuum pump to the recycling system 10 and, more specifically, for connecting to lines 17–19. Two terminals of the plug 27 respectively connect to, and are interconnected by, a jumper 28 on the plug 27. While the plug 27 is shown as a 5-terminal plug, since only 5 terminals are used, it may have a larger number of terminals to permit spacing between primary (line voltage) and secondary (low voltage) terminals.

Referring to FIG. 2, the recycling system 10 is adapted to be connected to the air-conditioning system of an automotive vehicle, as at 30, the connection 30 being coupled through a suitable filter and a vacuum solenoid valve 31 to an oil separator 32 for removing oil from the refrigerant, the output of the oil separator 32 in turn being connected to a vacuum switch 33 and, through an oil separator solenoid valve 34, to a master filter/dryer 35, the output of which is connected through a manifold 36 to the suction port of a compressor/pump 37. The discharge of the compressor pump 37 is coupled to the input of an oil separator/reservoir 38. The system 10 is also provided with a low pressure cutoff switch 41 connected to the input of the oil separator solenoid 34 and a high pressure cutoff switch 42 connected to the output of the oil separator reservoir 38. The output of the oil separator/reservoir 38 is also connected through a vent solenoid valve 43 to a vent line 44. A process port of the compressor/pump 37 is connected through a solenoid valve 45 to a return port of the oil separator/reservoir 38. The output of the condenser 40 is connected through a moisture indicator 46 and a liquid solenoid valve 47 to the Input of a refrigerant recovery tank 50 through suitable anti-blowback valves. The input of the tank 50 is also connected through a purge solenoid valve 51 and an air filter 52 in a purge line, and is also connected to a purge transducer 53.

The refrigerant recovery tank 50 has a liquid outlet coupled through a filter and suitable anti-blowback valves, and then through a charge solenoid valve 55 and a check valve 56 to the automotive connection point 30. The output of the oil separator 32 is connected through a filter bypass solenoid valve 58 to a vacuum conduit 57, the other end of which is normally connected to the manifold 36.

The vacuum pump 26 has a suction port and an exhaust port. In order to install the vacuum pump 26 in the recycling system 10, a cap or plug 29 is removed from the suction port of the vacuum pump 26, the lower end of the vacuum conduit 57 is disconnected from the manifold 36 and reconnected to the suction port of the vacuum pump 26, and the plug 29 is then installed on the port of the manifold 36 from which the vacuum line 57 was just disconnected, resulting in the arrangement illustrated in FIG. 2. The discharge port of the vacuum pump 26 is vented to atmosphere. The electrical plug 27 of the vacuum pump 26 is then plugged into the socket 20 of the recycling system 10 (see FIG. 1). A suitable mount (not shown) is provided on the housing of the recycling system 10 to facilitate supporting of the vacuum pump 26 on the housing in a position where it can be conveniently connected to the pneumatic circuitry of the recycling system 10 and to the electrical circuitry thereof.

It will be appreciated that the recycling system 10 can be operated in a number of different modes, most of which are not germane to the subject matter of this application and, therefore, will not be described herein. In operation, when the vacuum pump 26 is installed on the recycling system 10, as indicated in FIGS. I and 2, its presence will be detected by the processor 16 by reason of the fact that the sense lines 22 and 23 are interconnected by the jumper 28 on the vacuum pump plug 27. The program which controls the operation of the processor 16 includes a routine responsive to the sensing circuit of which the sense lines 22 and 23 form a part, to control the operation of the system 10 .

Figure 3:
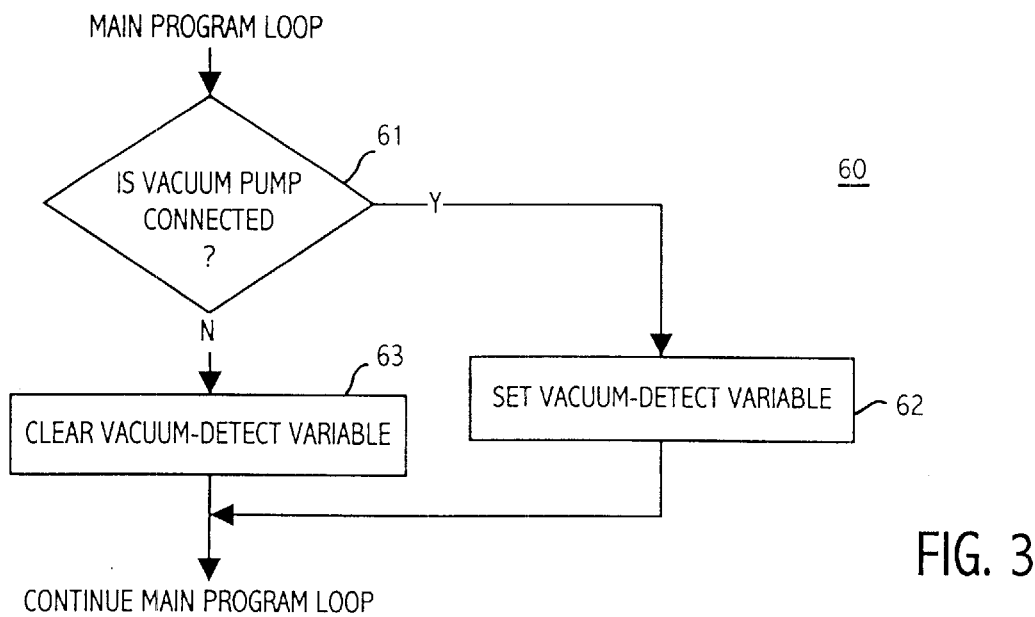
FIG. 3 is a flow diagram of the main program loop of a software program for controlling the operation of the processor of the system of FIG. 1.
Figure 4:
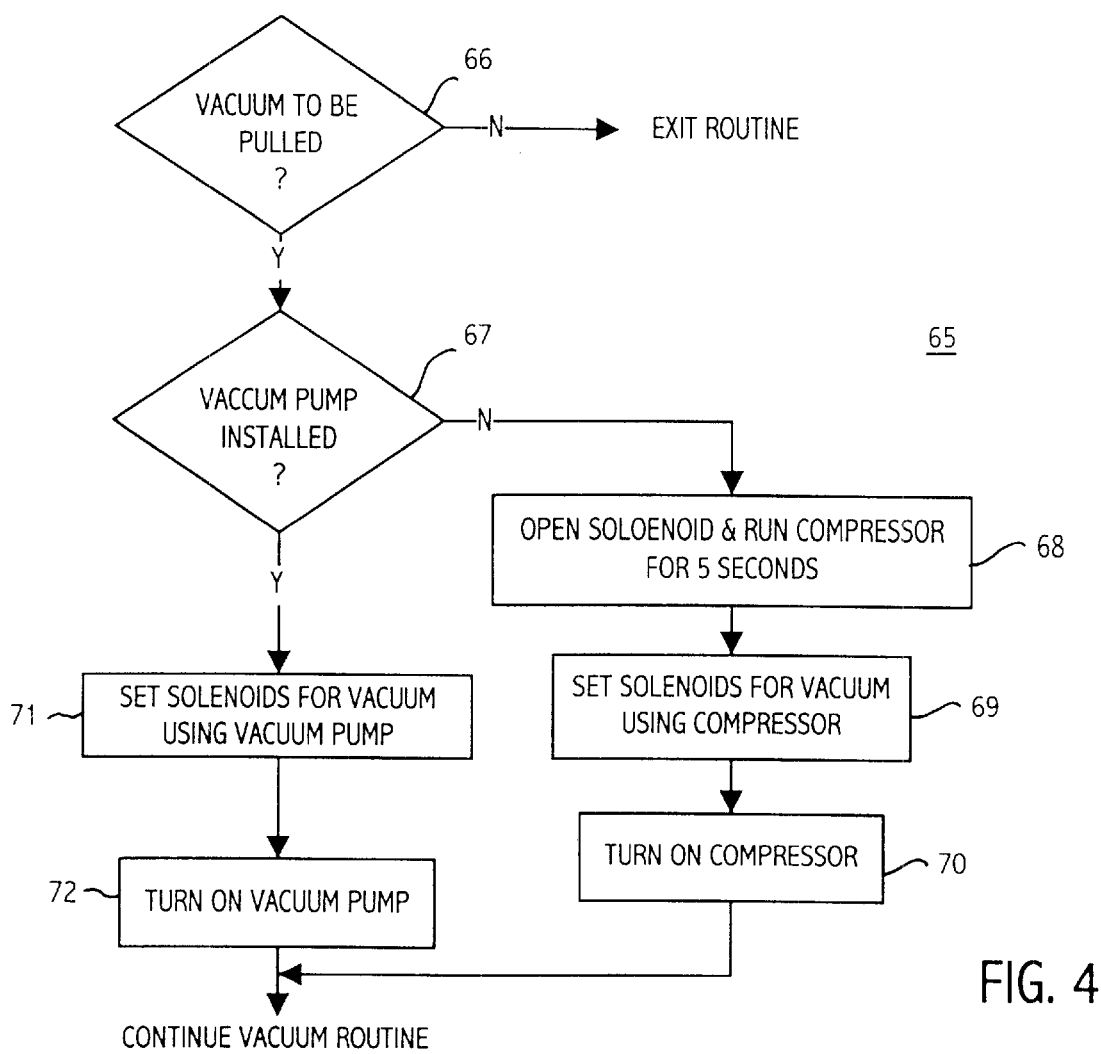
FIG. 4 is a flow diagram of a routine of the software program.

Referring to FIG. 3, there is illustrated a flow chart for a portion of the main program loop of the program for the processor 16, this portion being designated 60. In this portion of the loop, the program checks at 61 to see if a vacuum pump is connected, by monitoring the sensing circuit. If a vacuum pump is connected, the program then sets a vacuum-detect variable at 62 and, if it is not connected, it clears the vacuum detect variable at 63 and proceeds to the remainder of the loop. The program operates in a normal manner until the operator signals that a vacuum is to be pulled on the air-conditioning system of the vehicle being serviced. At this point the program enters a vacuum routine 65, illustrated in FIG. 4. The routine first checks at 66 to see if a vacuum is to be pulled. If not, it exists the routine and returns to the main loop. If a vacuum is to be pulled, the program next checks at 67 to see if the vacuum detect variable is set (FIG. 3) signifying that the vacuum pump 26 is installed. If it is not, the routine then moves to 68 to open the oil solenoid valve 45 and then runs the compressor/pump 37 for about five seconds to remove from the oil separator 38 any oil which might be accumulated therein. Next, the program, at 69, opens the vacuum solenoid valve 31, the filter bypass solenoid valve 58 and the vent solenoid valve 43 for drawing a vacuum on the refrigeration system using the compressor/pump 37. Then, at 70, it turns on the compressor 37 to draw a vacuum.

If, at 67, the vacuum pump is installed, the routine then, at 71, opens the vacuum solenoid valve 31 and the filter bypass solenoid valve 58 and closes all other solenoid valves, for drawing a vacuum using the vacuum pump 26 and then, at 72 turns on the vacuum pump for drawing vacuum.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants'0 contribution. The actual scope of the protection sought is intended to be defined in the following claims when viewed in their proper perspective based on the prior art.

We claim:

1. An automatic refrigerant handling apparatus comprising:

a compressor pump having a suction port adapted to be coupled to an associated refrigeration system to be serviced and a discharge port, a condenser coupled to the discharge port, a refrigerant storage vessel coupled to the condenser, control circuitry including a processor operating under control of a stored program and coupled to the compressor pump for controlling operation thereof in accordance with a predetermined procedure for withdrawing refrigerant from the refrigeration system, and a connection jack connected to the control circuitry and adapted to mateably receive a connector of an associated optional device, the control circuitry including a sensing circuit for detecting connection of the connector to the jack, the stored program including a routine responsive to the sensing circuit for altering the predetermined procedure to utilize the optional device if connection of the connector to the jack is detected.

2. The apparatus of claim 1, wherein the control circuitry includes two sense terminals on the connection jack adapted to be connected by a jumper on the connector of the associated optional device.

3. The apparatus of claim 1, wherein the optional device is a vacuum pump, and further comprising a pneumatic circuit for pneumatically coupling the vacuum pump to the refrigeration system to be serviced.

4. The apparatus of claim 3, wherein the pneumatic circuit includes one or more valves operable by the control circuitry.

5. The apparatus of claim 3, wherein the program routine is operable whenever the apparatus is operable in a mode for drawing a vacuum on the associated refrigeration system to be serviced.

6. The apparatus of claim 3, wherein the program routine utilizes the vacuum pump to reduce the pressure in the associated refrigeration system to be serviced to a pressure lower than that which could be achieved with the compressor pump.

7. An automatic refrigerant handling apparatus comprising:

a compressor pump having a suction port adapted to be coupled to an associated refrigeration system to be serviced and a discharge port, a condenser coupled to the discharge port, a refrigerant storage vessel coupled to the condenser, control circuitry including a processor operating under control of a stored program and coupled to the compressor pump for controlling operation thereof in accordance with a predetermined procedure for withdrawing refrigerant from the refrigeration system and for evacuating the refrigeration system to a first system pressure, a vacuum pump removably connectable to the refrigeration system for evacuating the refrigeration system to a second system pressure below the first system pressure, and coupling structure for removably coupling the vacuum pump to the control circuitry and including a sensing circuit, the processor being coupled to the sensing circuit for detecting the presence of the vacuum pump, the stored program including a routine for altering the predetermined procedure to utilize the detected vacuum pump rather than the compressor pump for evacuating the refrigeration system.

8. The apparatus of claim 7, wherein the coupling structure includes a connection jack connected to the control circuitry and a connector connected to the vacuum pump and adapted to be mateably received in the connection jack.

9. The apparatus of claim 8, wherein the sensing circuit includes two terminals on the connection jack and a jumper on the connector for interconnecting the two terminals when the connector is connected to the jack.

10. The apparatus of claim 7, and further comprising a pneumatic circuit for pneumatically coupling the vacuum pump to the associated refrigeration system to be serviced.

11. The apparatus of claim 10, wherein the pneumatic circuit includes one or more valves operable by the control circuitry.

12. The apparatus of claim 7, wherein the program routine is operable whenever the apparatus is operable in a mode for drawing a vacuum on the associated refrigeration system to be serviced.

13. A method of handling refrigerant for a refrigeration system comprising:

providing refrigerant handling apparatus including a compressor pump and using the compressor pump to withdraw refrigerant from the refrigeration system and return refrigerant to the refrigeration system in accordance with a predetermined procedure, sensing whether or not an optional device is connected to the refrigerant handling apparatus, and if the optional device is connected to the refrigerant handling apparatus, modifying the predetermined procedure to utilize the optional device.

14. The method of claim 13, wherein the optional device is a vacuum pump, and further comprising, if the vacuum pump is not connected, using the compressor pump to evacuate the refrigeration system to a first system pressure and, if the vacuum pump is connected, utilizing the vacuum pump rather that the compressor pump to evacuate the refrigeration system to a second system pressure lower than the first system pressure.

15. The method of claim 14, and further comprising coupling the vacuum pump to the refrigerant handling apparatus.

\* \* \* \* \*